United States Patent Office 3,502,684
Patented Mar. 24, 1970

3,502,684
N-[2-(2-AZA-ADAMANT-2-YL)-ETHYL]-GUANIDINES
André R. Gagneux, Basel, Switzerland, assignor to Geigy Chemical Corporation, Greenburgh, N.Y., a corporation of Delaware
No Drawing. Filed June 1, 1966, Ser. No. 554,327
Claims priority, application Switzerland, June 2, 1965, 7,711/65
Int. Cl. C07d 29/30, 29/28; A61k 27/00
U.S. Cl. 260—293                                   2 Claims

ABSTRACT OF THE DISCLOSURE

The compounds are of a class of N-[2-(2-aza-adamant-2-yl-ethyl]-guanidines which are useful for the treatment of hypertension and are prepared by reacting 2-(2-aminoethyl)-2-aza-adamantane with e.g. S-methyl-isothiourea, N-alkyl derivatives thereof, nitrosoguanidine, etc. A typical embodiment is N-2-,2-aza-adamant-2-yl)-ethyl-guanidine.

---

The present invention relates to new guanidine derivatives as new substances as well as medicaments containing such substances and the use thereof.

More in particular the invention concerns guanidine derivatives of the formula

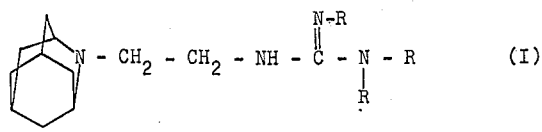

wherein R represents hydrogen or at most one of these symbols represents a lower alkyl radical, and their salts with inorganic and organic acids which have valuable pharmacological properties; especially, they have sympathicolytic activities, which render them useful therapeutically for the treatment of hypertension.

The guanidine derivative of Formula I in which all R's represent hydrogen, and its phermaceutically acceptable salts with acids are preferred in such treatment since they possess significant hypotensive activity of prolonged duration. Moreover—and this result is completely unexpected—this preferred class of guanidine derivatives according to the invention produces no initial raise in blood-pressure; this property is in strict contrast to results obtained with guanethidine, a known antihypertensive compound of somewhat related structure.

To produce the guanidine derivatives of Formula I, 2-(2-aminoethyl)-2-aza-adamantane of the formula

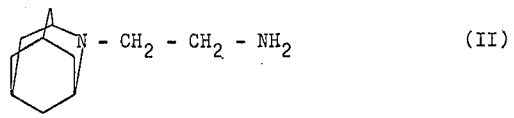

is reacted with a compound of the formula

wherein

X is a radical which can be split off, particularly a lower alkylthio or alkoxy radical, the nitroso-amino radical NO—NH— or a substituted 1-pyrazoyly radical such as the 3,5-dimethyl-1-pyrazolyl radical, and
R has the meanings given in Formula I, or with an acid addition salt thereof and, if desired, the base is liberated from the salt obtained as immediate reaction product and, if desired, the free base is converted into a salt with another inorganic or organic acid.

Suitable starting materials of the Formula III are, in particular S-methyl-isothourea and N-alkyl derivatives thereof in the form of mineral acid, particularly sulfuric acid, salts. Also, S-ethyl-isothiourea bromide, O-methyl-isourea sulfate and N-alkyl derivatives thereof as well as nitroso-guanidine, for example, can be used as starting materials. The reaction is performed e.g. in water or in a water-soluble organic solvent, e.g. a lower alkanol such as methanol, ethanol, propanol, isopropanol, in an ether-type liquid such as dioxan, tetrahydrofuran or diethylene glycol dimethyl ether; in a ketone such as acetone or butanone; in a lower alkanoic acid such as acetic acid; or in a lower aliphatic amide such as formamide or dimethyl formamide, or in mixtures of such solvents with water. The reaction is preferably performed by heating up to at most the boiling temperature of the reaction medium used.

Starting materials of Formula II can be produced in various ways starting from known 2-aza-adamantane. For example, the compound mentioned can be reacted e.g. with chloroacetyl chloride to form 2-chloroacetyl-2-aza-adamantane. This compound is reacted with alkali metal azides to form 2-azidoacetyl-2-aza-adamantanes and the latter is reduced either directly with lithium aluminum hydride to form compounds of Formula II, or it is first catalytically hydrogenated to 2-aminoacetyl-2-aza-adamantane and the latter is reduced with lithium aluminum hydride.

The compounds of Formula I obtained directly or, optionally, after liberation from the salts formed as immediate reaction products, are converted subsequently, if desired, into their addition salts with inorganic and organic acids in the usual way. For example, the acid, or a solution thereof, which is desired as salt component is added to a solution of a compound of Formula I in an organic solvent such as methanol ethanol or ether and the precipitated salt is isolated.

For use as medicaments, pharmaceutically acceptable addition salts can be used instead of the free bases, i.e. salts with those acids the anions of which are pharmaceutically acceptable in the ususal dosages. It is also of advantage if the salts to be used as medicaments crystallize well and are not or are only slightly hygroscopic. For example, hydrochloric acid, hydrobromic acid, sulfuric acid, phosphoric acid, methane sulfonic acid, 1,2-ethane disulfonic acid, β-hydroxyethane sulfonic acid, acetic acid, malic acid, tartaric acid, citric acid, lactic acid, oxalic acid, succinic acid, fumaric acid, maleic acid, benzoic acid, salicyclic acid, phenylacetic acid, mandelic acid and embonic acid can be used for salt formation with the compounds of Formula I.

The new active substances are administered orally, rectally or parenterally. The daily dosages of the free bases or of pharmaceutically acceptable salts thereof vary between 25 and 2000 mg. for adult patients. Suitable dosage units such as dragées (sugar-coated tablets), tablets, suppositories or ampoules, preferably contain 10–500 mg. of active substance according to the invention.

Dosage units for oral administration preferably contain between 0.1% and 90% of a compound of Formula I or pharmaceutically acceptable salt thereof as active substance. They are produced by combining the active substance, e.g. with solid, pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate or polyethylene glycols (carbowaxes) of suitable molecular weights to form tablets or dragée cores. The latter are coated e.g. with concentrated sugar solutions which can also contain, e.g. gum arabic, talcum and/or titanium dioxide, or with a lacquer dissolved in easily volatile organic solvents or mixtures of solvents. Dyestuffs can be added to these coatings, e.g. to distinguish between varying dosages of active substance.

Examples of dosage units for rectal administration are, on the one hand suppositories which consist of a combination of an active substance according to the invention with a neutral fatty foundation, and, on the other hand, gelatine rectal capsules which contain a combination of the active substance with polyethylene glycols (carbowaxes) of suitable molecular weight.

Ampoules for parenteral, particularly intramuscular, administration perferably contain a water-soluble salt of a compound of Formula I in a concentration of, preferably 0.5–5%, in aqueous solution, e.g. together with suitable stabilizing agents and buffer substances.

The following non-limitative examples further illustrate the invention. The temperatures are given in degrees centigrade. Percentages are by weight unless expressly stated otherwise.

EXAMPLE 1

720 mg. (4 mM.) of 2-(2-aminoethyl)-2-aza-adamantane and 1.1 g. (4 mM.) of methyl isothiuronium sulfate are refluxed for 5 hours in 20 ml. of 96% ethanol. After cooling, the reaction mixture is filtered and the filter residue is washed with ethanol and ether. The residue is then stirred for 30 minutes in 20 ml. of methylene chloride and 5 ml. of concentrated potassium hydroxide solution. After filtration the solution is dried over potassium carbonate and evaporated. The residue is treated with 50 ml. of methylene chloride and 20 mM. of ethereal hydrochloric acid. The dihydrochloride of N-[2-(2-aza-adamant-2-yl)-ethyl]-guanidine which precipitates in finely crystalline form is filtered, washed with methylene chloride and ether and finally dried for 10 hours at 20° and 12 Torr.

The 2-(2-aminoethyl)-2-aza-adamantane used above as starting material is prepared as follows:

(a) 2.50 g. (22 mM.) of chloroacetyl chloride are added to 3.30 g. (19 mM.) of 2-aza-adamantane hydrochloride (produced according to A. Stetter et al., Ber. 97, 3480 (1964)) and 7.0 ml. (50 mM.) of triethylamine in 50 ml. of anhydrous chloroform, the addition being made at 0°. The resulting mixture is then stirred for 5 hours at 20° and subsequently concentrated. 100 ml. each of benzene, ether and water are added to the residue. The aqueous phase is removed and the organic phase washed with 150 ml. portions of 2 N hydrochloric acid, water, 1 N sodium bicarbonate solution and, again, water. The organic phase is dried over magnesium sulphate and concentrated. On recrystallizing the residue from 50 ml. of hexane, 2-chloroacetyl-2-aza-adamantane is obtained; M.P. 105–107°.

(b) 2.14 g. (10 mM.) of 2-chloroacetyl-2-aza-adamantane and 6.5 g. (100 mM.) of sodium azide are stirred for 15 hours at 60° in 44 ml. of acetone and 22 ml. of water. The acetone is distilled off at 30° under reduced pressure and the residue diluted with 50 ml. of ice cold water. The crystals obtained by filtering the above mixture are dissolved in 100 ml. of benzene. The benzene solution is dried over magnesium sulfate and, on concentrating under reduced pressure at 30°, 2-azidoacetyl-2-aza-adamantane is obtained, M.P. 76–78°.

(c) 1.50 g. (40 mM.) of lithium aluminum hydride are added in portions to 1.7 g. (7.7 mM.) of 2-azidoacetyl-2-aza-adamantane in 85 ml. of anhydrous ether, with ice-cooling and vigorous stirring. After the evolution of gas has subsided, the reaction mixture is refluxed for 20 hours. After cooling to 0°, 10 ml. of ethyl acetate, 1.5 ml. of water, 1.5 ml. of aqueous 15% sodium hydroxide solution and finally another 4.5 ml. of water are added dropwise in that order. Filtration and evaporation of the filtrate followed by distilling the residue at 60° and 0.01 Torr, leads to 2-(2-aminoethyl)-2-aza-adamantane. The dihydrochloride thereof decomposes at 265–270°.

EXAMPLE 2

13.6 g. (75 mM.) of 2-(2-aminoethyl)-2-aza-adamantane and 28 g. (151 mM.) of ethyl isothiuronium bromide in 250 ml. of anhydrous ethanol are refluxed for 2 hours. The mixture is evaporated to dryness is vacuo. The resulting residue is dissolved in 50 ml. of water and, while cooling with ice, treated with 100 ml. of sodium hydroxide soltuion. The bases which precipitate are extracted with two 200 ml.-portions of chloroform. The combined organic extracts are dried over potassium carbonate and concentrated in vacuo.

On addition of 2 N anhydrous ethanolic hydrochloric acid, the dihydrdochloride of N-[2-(2-aza-adamant-2-yl)-ethyl]-guanidine is obtained. It is purified as described in Example 1.

EXAMPLE 3

5.4 g. (30 mM.) of 2-(2-aminoethyl)-2-aza-adamantane and 6 g. (30 mM.) of 1-amidino-3,5-dimethyl pyrazole nitrate in 80 ml. of water are heated for 12 hours at 100°. After cooling, the solution is washed with 100 ml. of ether, and 30 ml. of 1 N sodium methylate solution are added to the aqueous phase. The latter is concentrated, the resulting residue is taken up in 100 ml. of chloroform, filtered, and the product is worked up as described in Example 1.

EXAMPLE 4

2.95 g. (10 mM.) of N-2-guanidinoethyl-2-aza-adamantane dihydrochloride are covered with 50 ml. of chloroform and then treated with 50 ml. of ice-cold concentrated sodium hydroxide solution in a separatory funnel. The organic phase is separated off and the aqueous phase extracted with another 50 ml. of chloroform. After drying the combined chloroform extracts over solid potassium hydroxide and evaporation of the solvent, an almost quantitative yield of N-2-guanidinoethyl-2-aza-adamantane is obtained.

EXAMPLE 5

2.22 g. (10 mM.) of N-2-guanidinoethyl-2-aza-adamantane in 50 ml. of anhydrous methanol are treated with a solution of 1.00 g. (11 mM.) of oxalic acid in 30 ml. of methanol. After a few minutes crystals start to separate. Fltration and two washings with cold methanol yield the N-2-guanidinoethyl-2-aza-adamantane oxalate; M.P. 247° (decomposition).

The following prescriptions further illustrate the production of tablets and dragées:

EXAMPLE I 1000.0 g. of N-[2-2-aza-adamant-2-yl)-ethyl]-guanidine dihydrochloride as active substance, are mixed with 550.0 g. of lactose and 292.0 g. of potato starch, the mixture is moistened with an alcoholic solution of 8.0 g. of gelatine and granulated through a sieve. After drying, 60.0 g. of potato starch, 60.0 g. of talcum and 10.0 g. of magnesium stearate and 20.0 g. of colloidal silica are mixed in. This mixture is pressed into 10,000 tablets each weighing 200 mg. and containing 100 mg. of active substance (dihydrochloride). If desired the tablets can be grooved for better adaptation of the dosage.

EXAMPLE II 200.0 g. of N-[2-(2-aza-adamant-2-yl)-ethyl] guanidine dihydrochloride as active substance, are well mixed with 16 g. of maize starch and 6.0 g. of colloidal silica. The mixture is moistened with a solution of 2.0 g. of stearic acid, 6.0 g. of ethyl cellulose and 6.0 g. of stearin in about 70 ml. of isopropyl alcohol and granulated through a sieve III (Ph. Helv. V.). The granulate is dried for about 14 hours and then passed through a sieve III–IIIa. It is then mixed with 16.0 g. of maize starch, 16.0 g. of talcum and 2.0 g. of magnesium stearate and the mixture is pressed into 1000 dragée cores. These are coated with a concentrated syrup made up from 2.000 g. of shellac, 7.500 g. of gum arabic, 0.150 g. of dyestuff, 2.00 g. of highly dispersed silica, 25.000 g. of talcum and 53.350 g. of sugar and dried. The dragées obtained each weigh 360 mg. and contain 200 mg. of active substance.

We claim:
1. A compound selected from among the guanidine derivatives of the formula

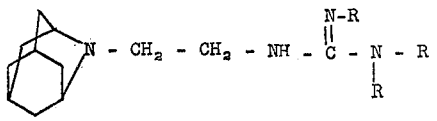

wherein R represents hydrogen or at most one of these symbols represents lower alkyl, and the pharmaceutically acceptable addition salts thereof with acids.

2. A compound selected from among the guanidine derivative of the formula

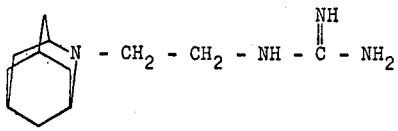

and a pharmaceutically acceptable addition salt thereof with an acid.

References Cited
FOREIGN PATENTS
1,481,701  5/1967  France.

HENRY R. JILES, Primary Examiner
G. T. TODD, Assistant Examiner

U.S. Cl. X.R.
260—564; 424—267